US009103556B2

(12) United States Patent
Lee et al.

(10) Patent No.: US 9,103,556 B2
(45) Date of Patent: Aug. 11, 2015

(54) MULTI TYPE AIR CONDITIONER AND METHOD OF CONTROLLING THE SAME

(75) Inventors: Jaewan Lee, Seoul (KR); Sanghun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 563 days.

(21) Appl. No.: 13/433,454

(22) Filed: Mar. 29, 2012

(65) Prior Publication Data

US 2012/0285655 A1 Nov. 15, 2012

(30) Foreign Application Priority Data

May 11, 2011 (KR) ........................ 10-2011-0043904

(51) Int. Cl.
*F28F 27/02* (2006.01)
*F24F 3/06* (2006.01)
*F24F 11/00* (2006.01)
*F25B 5/02* (2006.01)
*F25B 13/00* (2006.01)
*F25B 41/06* (2006.01)

(52) U.S. Cl.
CPC ............. *F24F 3/065* (2013.01); *F24F 11/0009* (2013.01); *F25B 5/02* (2013.01); *F25B 13/00* (2013.01); *F25B 41/062* (2013.01); *F25B 2313/0233* (2013.01)

(58) Field of Classification Search
CPC ......... F24F 3/065; F24F 11/0009; F25B 5/02; F25B 2313/0233
USPC ........... 62/117, 157, 199, 200, 203, 204, 231; 700/276
See application file for complete search history.

(56) References Cited

U.S. PATENT DOCUMENTS 5,383,336 A * 1/1995 Nishida et al. .................. 62/115
5,499,510 A * 3/1996 Yoshida et al. ................. 62/175
6,126,080 A * 10/2000 Wada .............................. 236/51

OTHER PUBLICATIONS

KR 20070030076 (English translation).*
KR 20070030076: published Mar. 15, 2007 (English Translation).*

* cited by examiner

*Primary Examiner* — Jonathan Bradford
(74) *Attorney, Agent, or Firm* — KED & Associates, LLP

(57) ABSTRACT

A multi type air conditioner may include an outdoor unit, a distributor connected to the outdoor unit, and a plurality of indoor units connected to the distributor. The distributor may include a plurality of pipe ports. Two or more of the indoor units may be connected to one or more of the pipe ports to form an indoor unit group. An operation mode of the two or more indoor units forming the indoor unit group may operate in a reference mode that corresponds to an operation mode of a main indoor unit or an appropriate pipe port.

11 Claims, 10 Drawing Sheets

MULTI TYPE AIR CONDITIONER AND METHOD OF CONTROLLING THE SAME

CROSS-REFERENCE TO RELATED APPLICATION(S)

This application claims priority under 35 U.S.C. §119 to Korean Application No. 10-2011-0043904 filed in Korea on May 11, 2011, whose entire disclosure is hereby incorporated by reference.

BACKGROUND

1. Field

This relates to an air conditioner, and in particular a multi type air conditioner and a method of controlling such a multi type air conditioner.

2. Background

Air conditioners may employ a refrigerant cycle including a compressor, a condenser, an expansion mechanism, and an evaporator to heat/cool an indoor space and/or purify air. In certain air conditioners, a single indoor unit may be connected to a single outdoor unit. In multi type air conditioners, a plurality of indoor units may be connected to a single outdoor unit.

BRIEF DESCRIPTION OF THE DRAWINGS

The embodiments will be described in detail with reference to the following drawings in which like reference numerals refer to like elements wherein.

DETAILED DESCRIPTION

Figure 1:
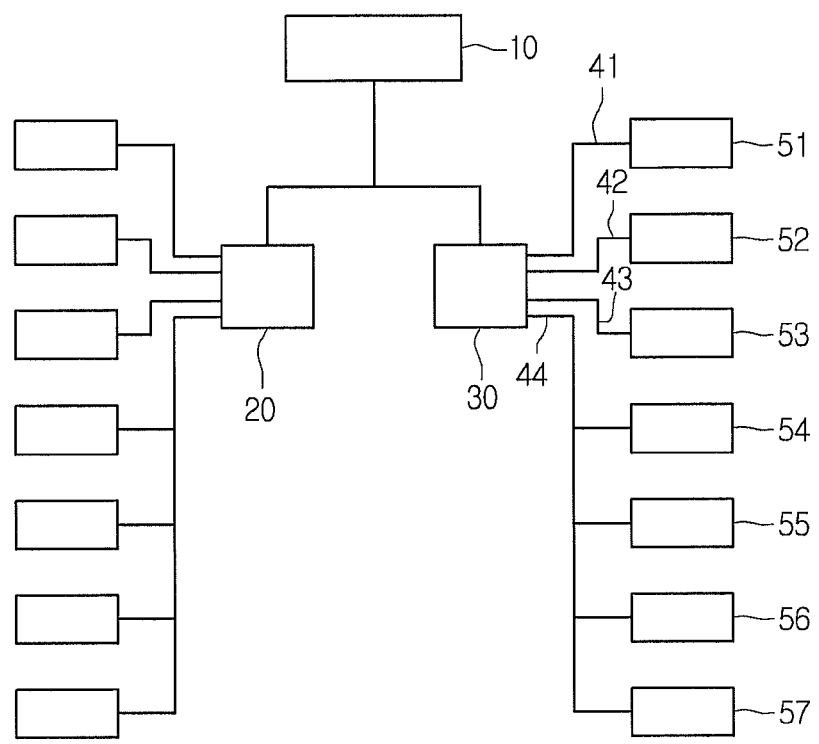
FIG. 1 is a schematic view of a multi type air conditioner according to an embodiment as broadly described herein.

Hereinafter, exemplary embodiments will be described with reference to the accompanying drawings. Wherever possible the same elements will be designated by the same reference numerals. Simultaneous heating/cooling air conditioners may include a distributor between an outdoor unit and indoor units to control refrigerant flow. In such a system, some of the indoor units may cool corresponding indoor space(s), and the remainder may heat corresponding indoor space(s). Such a distributor may include a plurality of pipe ports each having a corresponding indoor unit connected thereto. In certain arrangements, the number of distributors may be increased to accommodate an increased number of indoor units, thus increasing material and installation costs.

Referring to FIG. 1, a multi type air conditioner according to an embodiment as broadly described herein may include at least one outdoor unit 10, a plurality of indoor units 51 to 57, and one or more distributors 20 and 30 connecting the outdoor unit 10 to the indoor units 51 to 57. In this exemplary embodiment, one outdoor unit 10, two distributors 20 and 30, and seven indoor units 51 to 57 at each of the distributors 20 and 30 are provided. However, embodiments are not limited to this number of indoor units, outdoor units, and distributors, and other arrangements may also be appropriate. First to fourth pipe ports 41, 42, 43, and 44 may be provided at each of the distributors 20 and 30. However, the number of pipe ports provided to each of the distributors 20 and 30 is not limited thereto, and other arrangements may also be appropriate.

The first, second, and third indoor units 51, 52 and 53 may be respectively connected to the first, second, and third pipe ports 41, 42 and 43. Indoor units may be connected in parallel to the fourth pipe port 44. For example, the fourth, fifth, sixth, and seventh indoor units 54, 55, 56 and 57 may be connected to the fourth pipe port 44.

Herein, the indoor units 54, 55, 56 and 57 connected to the fourth pipe port 44 may be referred to as grouped indoor units, or an indoor unit group.

In this embodiment, a plurality of indoor units are connected to the fourth pipe port 44. However, in alternative embodiments, a plurality of indoor units may be respectively connected to a plurality of pipe ports.

Figure 2:
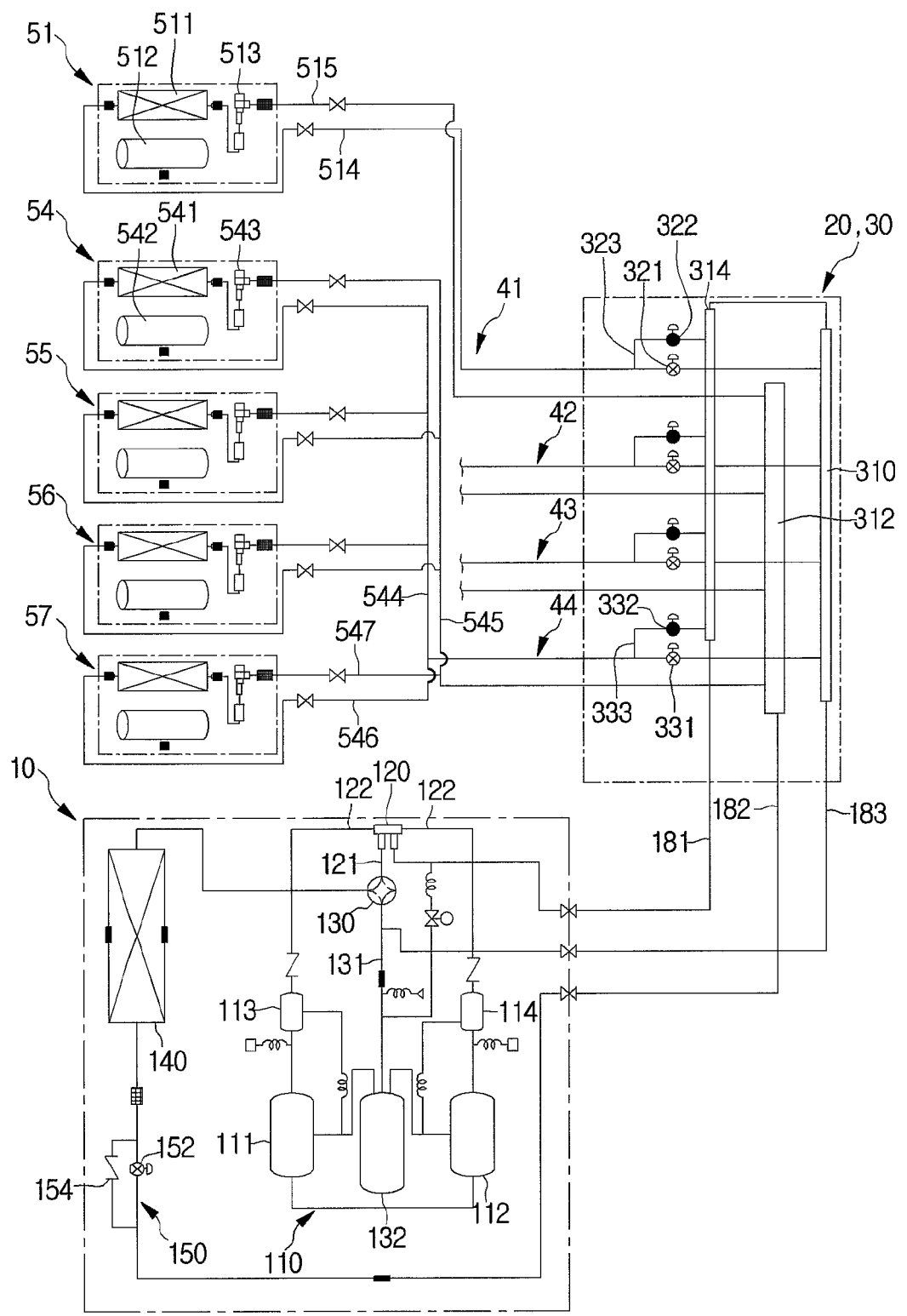
FIG. 2 is a schematic view of a refrigerant cycle of a multi type air conditioner according to an embodiment as broadly described herein.

FIG. 2 is a schematic view of a refrigerant cycle of a multi type air conditioner according to an embodiment as broadly described herein. In the exemplary embodiment shown in FIG. 2, the first indoor unit 51 and fourth to seventh indoor units 54 and 57 connected to the distributor 20 or 30 are illustrated, and the second and third indoor units 52 and 53 shown in FIG. 1 are not illustrated.

Referring to FIG. 2, the outdoor unit 10 may include a compressor device 110, an outdoor heat exchanger 140, an outdoor expansion mechanism 150, and a switching valve 130. The compressor part 110 may include one or more compressors for compressing refrigerant, such as, for example, compressors 111 and 112. The compressors 111 and 112 may include an inverter compressor 111 having variable capacity, and a constant-speed compressor 112. The compressors 111 and 112 may be arranged in parallel. An intake tube 131 of the compressors 111 and 112 may be connected to the switching valve 130. An accumulator 132 may be installed on the intake tube 131.

Discharge passages of the compressors 111 and 112 may be provided with oil separators 113 and 114 for separating oil from the refrigerant, and a discharge distributor 120 connected to the switching valve 130 and the distributors 20 and 30. Oil separated from refrigerant by the oil separators 113 and 114 may be recovered to the compressor device 110.

A discharge distributor 120 may distribute the refrigerant discharged from the compressors 111 and 112 to the switching valve 130 and the distributors 20 and 30. The discharge distributor 120 may be connected to the distributors 20 and 30 by a high pressure gas tube 181. The discharge distributor 120 may be connected to the switching valve 130 by a first connecting tube 121, and to the oil separators 113 and 114 by second connecting tubes 122.

The outdoor heat exchanger 140 may function as a condenser in an all cooling operation or a cooling-dominant operation, and function as an evaporator in an all heating operation or a heating-dominant operation. Herein, in an all cooling operation, all indoor units perform a cooling operation, and in an all heating operation, all indoor units perform a heating operation. In a cooling-dominant operation, a total capacity of indoor units performing a cooling operation is greater than a total capacity of indoor units performing a heating operation. In a heating-dominant operation, a total capacity of indoor units performing a heating operation is greater than a total capacity of indoor units performing a cooling operation. The refrigerant within the outdoor heat exchanger 140 may exchange heat with outdoor air blown by an outdoor fan.

After being discharged from the outdoor heat exchanger 140, the refrigerant is not expanded by the outdoor expansion mechanism 150. Before being introduced to the outdoor heat exchanger 140, the refrigerant is expanded by the outdoor expansion mechanism 150. The outdoor expansion mechanism 150 may include an outdoor expansion valve between the outdoor heat exchanger 140 and the distributors 20 and 30, or include an outdoor expansion valve 152 and a check valve 154 with refrigerant passages connected in parallel between a refrigerant passage of the outdoor heat exchanger 140 and the distributors 20 and 30. The outdoor expansion valve 152 may be, for example, an electronic expansion valve (EEV).

The switching valve 130, in the all cooling operation or the cooling-dominant operation, may allow the refrigerant compressed by the compressors 111 and 112 to flow to the outdoor heat exchanger 140, and, in the all heating operation or the heating-dominant operation, may allow the refrigerant discharged from the outdoor heat exchanger 140 to flow to the compressors 111 and 112.

The outdoor expansion mechanism 150 may be connected to the distributors 20 and 30 by a liquid tube 182. The intake tube 131 may be connected to the distributors 20 and 30 by a low pressure gas tube 183.

The first to third indoor units 51 to 53 may independently perform a cooling or heating operation. In contrast, the fourth to seventh indoor units 54 to 57, which in this example, are grouped, may perform a cooling or heating operation together.

Each of the indoor units 51 to 57 may include an indoor heat exchanger 511 or 541 in which the refrigerant exchanges heat with indoor air to cool or heat the indoor air, an indoor fan 512 or 542 introducing indoor air into a corresponding one of the indoor units 51 to 57 for heat exchange in the indoor heat exchanger 511 or 541, and then, discharging the indoor air from the corresponding indoor unit, and an indoor expansion mechanism 513 or 543 expanding the refrigerant flowing to the indoor heat exchanger 511 or 541. The indoor expansion mechanisms 513 and 543 may be, for example, electronic expansion valves capable of adjusting the flow rate of refrigerant. Such electronic expansion valves may control the degree of opening to adjust the flow rate of refrigerant.

The distributors 20 and 30 may include a low pressure gas pipe 310, a liquid pipe 312, and a high pressure gas pipe 314. The low pressure gas pipe 310, the liquid pipe 312, and the high pressure gas pipe 314 may be connected to the outdoor unit 10 by the low pressure gas tube 183, the liquid tube 182, and the high pressure gas tube 181, respectively. The low pressure gas pipe 310, the liquid pipe 312, and the high pressure gas pipe 314 may be connected to the indoor units 51 to 57 by the first to fourth pipe ports 41 to 44.

Each of the first to third pipe ports 41 to 43 may include an indoor gas tube 514 and an indoor liquid tube 515. The fourth pipe port 44 may include a common indoor gas tube 544, a common indoor liquid tube 545, a plurality of individual indoor gas tubes 546 branching from the common indoor gas tube 544 and connecting to the fourth to seventh indoor units 54 to 57, respectively, and a plurality of individual indoor liquid tubes 547 branching from the common indoor liquid tube 545 and connecting to the fourth to seventh indoor units 54 to 57, respectively.

Low pressure valves 321 and 331 may be installed on the indoor gas tubes 514 and the common indoor gas tube 544 to control refrigerant flow between the low pressure gas pipe 310 and the indoor units 51 to 57. The high pressure gas pipe 314 may be connected to the pipe ports 41 to 44, particularly, to the indoor gas tubes 514 and the common indoor gas tube 544 through branch tubes 323 and 333. High pressure valves 322 and 332 are disposed on the branch tubes 323 and 333 to control refrigerant flow between the high pressure gas pipe 314 and the indoor units 51 to 57.

When the indoor units 51 to 57 connected to the pipe ports 41 to 44 are in a cooling operation, the low pressure valves 321 and 331 may be opened, and the high pressure valves 322 and 332 may be closed. On the contrary, when the indoor units 51 to 57 connected to the pipe ports 41 to 44 are in a heating operation, the low pressure valves 321 and 331 may be closed, and the high pressure valves 322 and 332 may be opened.

The low pressure valves 321 and 331, and the high pressure valves 322 and 332 may be, for example, electronic expansion valves to adjust the degree of opening linearly or in a stepwise fashion. Other types of valves may also be appropriate.

Hereinafter, refrigerant flow of a multi type air conditioner will now be described. An all cooling operation will be described first. Refrigerant flow of the all cooling operation is illustrated in FIG. 2.

Referring to FIG. 2, when the indoor units 51 to 57 are in the all cooling operation, the low pressure valves 321 and 331 are opened, and the high pressure valves 322 and 332 are closed.

In the all cooling operation, the refrigerant compressed by the compressors 111 and 112 sequentially passes through the switching valve 130 and the outdoor heat exchanger 140 via the discharge distributor 120, and then, flows from the outdoor unit 10 to the liquid pipe 312 of the distributors 20 and 30 through the liquid tube 182. The refrigerant arriving at the liquid pipe 312 flows to the indoor expansion mechanisms 513 and 543 of the indoor units 51 to 57, which are open in the all cooling operation, through the indoor liquid tubes 547 and 515. The refrigerant is then expanded by the indoor expansion mechanisms 513 and 543, and is evaporated by the indoor heat exchangers 511 and 541. The evaporated refrigerant flows from the indoor units 51 to 57 to the low pressure gas pipe 310 of the distributors 20 and 30 through the indoor gas tubes 514 and 544. The refrigerant arriving at the low pressure gas pipe 310 is introduced to the compressors 111 and 112 of the outdoor unit 10 through the low pressure gas tube 183.

Figure 3:
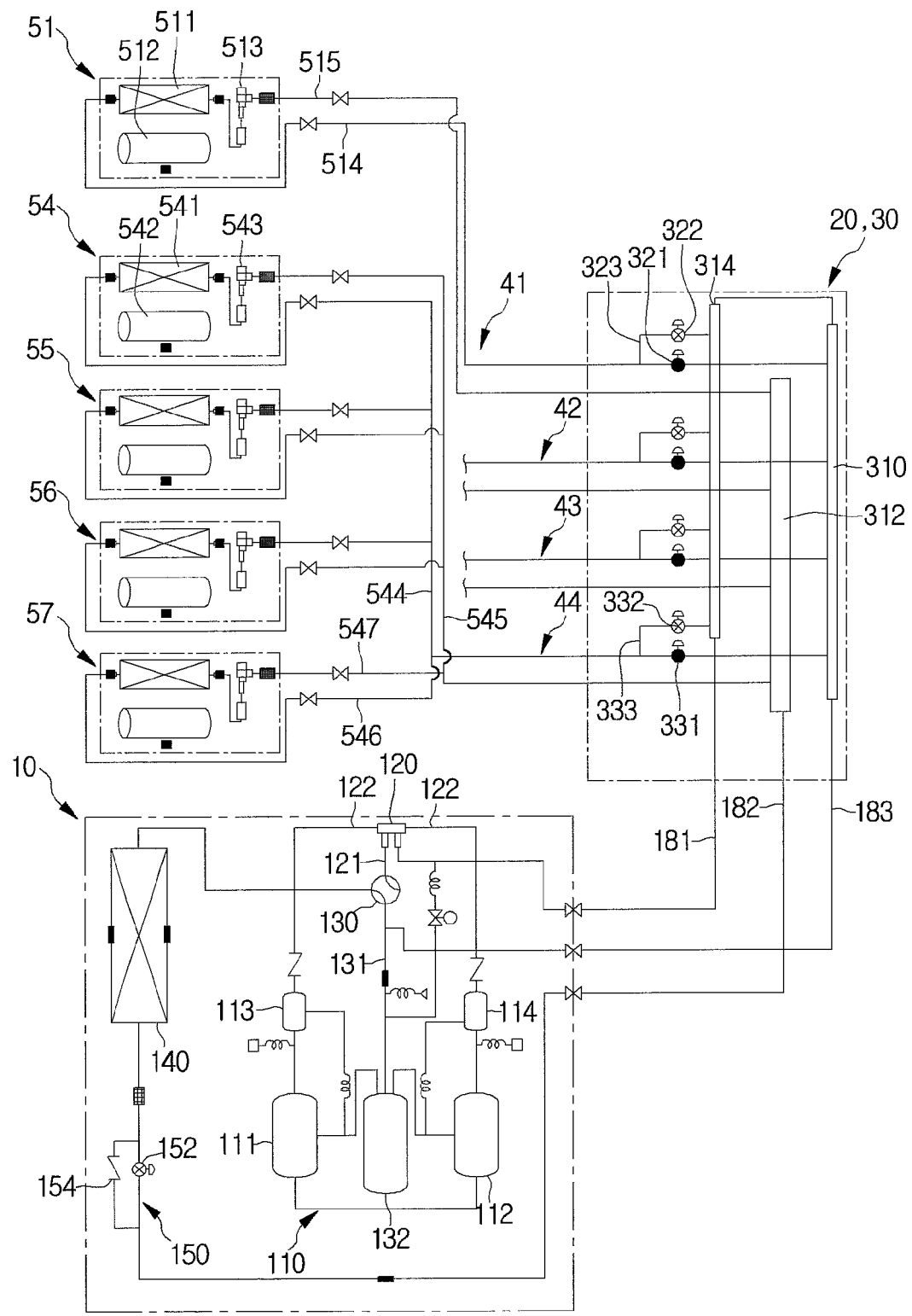
FIG. 3 is a schematic view illustrating refrigerant flow in a whole heating operation of a multi type air conditioner according to an embodiment as broadly described herein.

An all heating operation will now be described with reference to FIG. 3.

When the indoor units 51 to 57 are in the all heating operation, the low pressure valves 321 and 331 are closed, and the high pressure valves 322 and 332 are opened. In the all heating operation, the refrigerant compressed by the compressors 111 and 112 passes through the discharge distributor 120, and then flows from the outdoor unit 10 to the high pressure gas pipe 314 of the distributors 20 and 30 through the high pressure gas tube 181. The refrigerant arriving at the high pressure gas pipe 314 is introduced into the indoor heat exchanger 511 and 541 of the indoor units 51 to 57 through the indoor gas tubes 514 and 544, is condensed by the indoor heat exchangers 511 and 541, and then passes through the indoor expansion mechanisms 513 and 543 without expansion. The refrigerant then flows from the indoor units 51 to 57 to the liquid pipe 312 of the distributors 20 and 30 through the indoor liquid tubes 515 and 547. The refrigerant arriving at the liquid pipe 312 is introduced into the outdoor expansion mechanism 150 of the outdoor unit 10 through the liquid tube 182, and is expanded by the outdoor expansion mechanism 150. The expanded refrigerant is evaporated by the outdoor heat exchanger 140, and is introduced into the compressors 111 and 112 through the switching valve 130.

A cooling-dominant operation will now be described with respect to FIG. 4.

Figure 4:
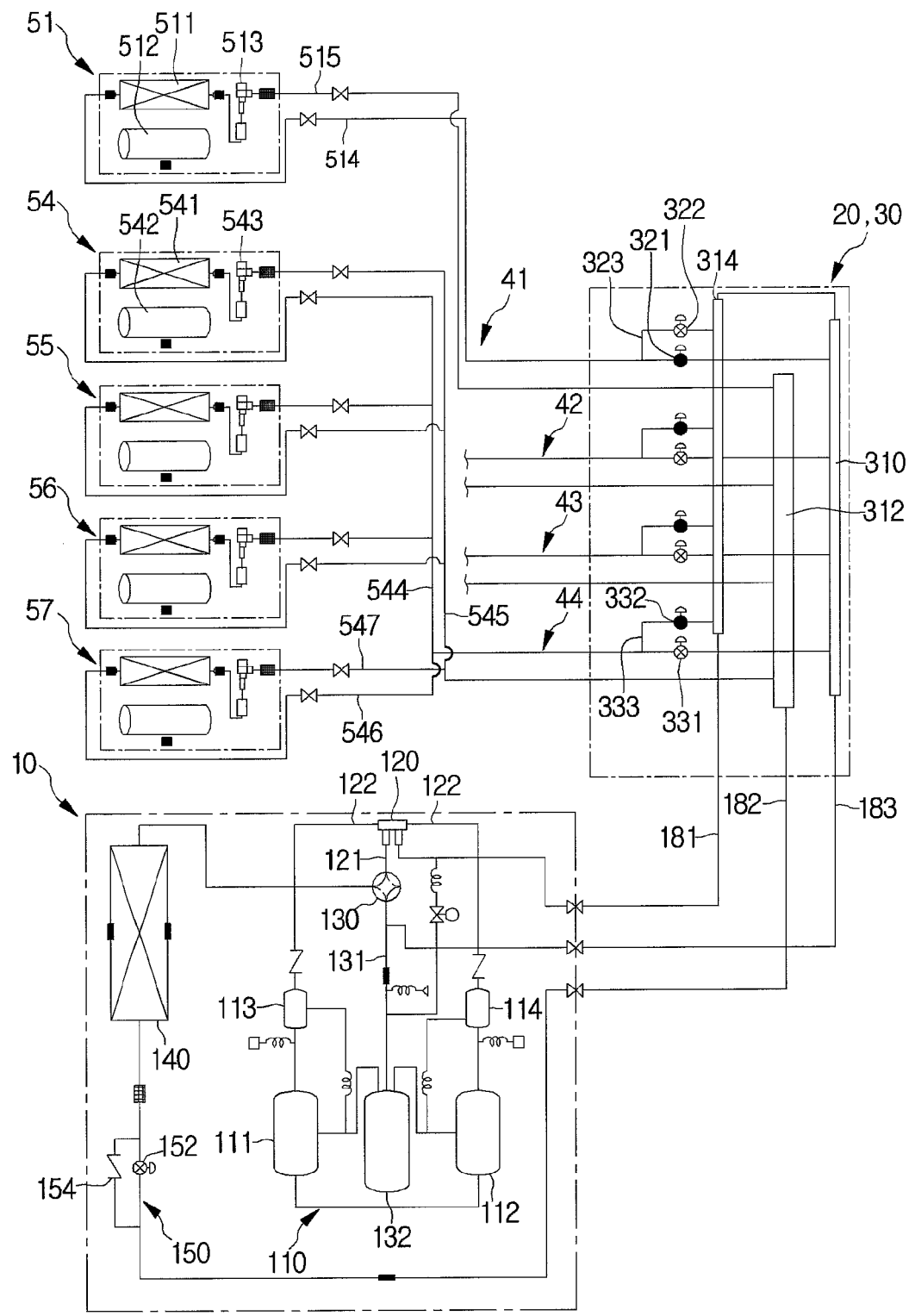
FIG. 4 is a schematic view illustrating refrigerant flow in a cooling-dominant operation of a multi type air conditioner according to an embodiment as broadly described herein.

In the exemplary arrangement shown in FIG. 4, the first indoor unit 51 is in a heating operation, and the second to seventh indoor units 52 to 57 are in a cooling operation. In the cooling-dominant operation, the low pressure valves 321 and 331 corresponding to the second to seventh indoor units 52 to 57 in the cooling operation are opened, and the high pressure valves 322 and 332 corresponding thereto are closed. On the contrary, the low pressure valve 321 corresponding to the first indoor unit 51 in the heating operation is closed, and the high pressure valve 322 corresponding thereto is opened.

The refrigerant compressed by the compressors 111 and 112 is divided by the discharge distributor 120, and a portion of the refrigerant sequentially passes through the switching valve 130 and the outdoor heat exchanger 140, and then flows from the outdoor unit 10 to the liquid pipe 312 of the distributors 20 and 30 through the liquid tube 182. The refrigerant arriving at the liquid pipe 312 flows to the indoor expansion mechanisms 513 and 543 of the indoor units 52 to 57, which are in the cooling operation, through the indoor liquid tubes 547 and 515. The refrigerant is then expanded by the indoor expansion mechanisms 513 and 543, and is evaporated by the indoor heat exchangers 511 and 541. The evaporated refrigerant flows from the indoor units 52 to 57, which are in the cooling operation, to the low pressure gas pipe 310 of the distributors 20 and 30 through the indoor gas tubes 514 and 544, and is then introduced into the compressors 111 and 112 of the outdoor unit 10 through the low pressure gas tube 183.

The remaining portion of the refrigerant divided by the discharge distributor 120 flows to the high pressure gas pipe 314 of the distributors 20 and 30 through the high pressure gas tube 181, and is introduced into the indoor heat exchanger 511 of the indoor unit 51, which is in the heating operation, through the high pressure valve 322, and is condensed. The condensed refrigerant then passes through the indoor expansion mechanism 513 without expansion, and flows to the liquid pipe 312 through the indoor liquid tube 515. The refrigerant is mixed with the refrigerant flowing from the outdoor unit 10 to the liquid pipe 312 through the liquid tube 182.

Accordingly, the indoor heat exchangers 511 and 541 of the indoor units 52 to 57 in the cooling operation function as evaporators to cool indoor spaces, and the indoor heat exchanger 511 of the indoor unit 51 in the heating operation functions as a condenser to heat an indoor space.

A heating-dominant operation will now be described with respect to FIG. 5.

Figure 5:
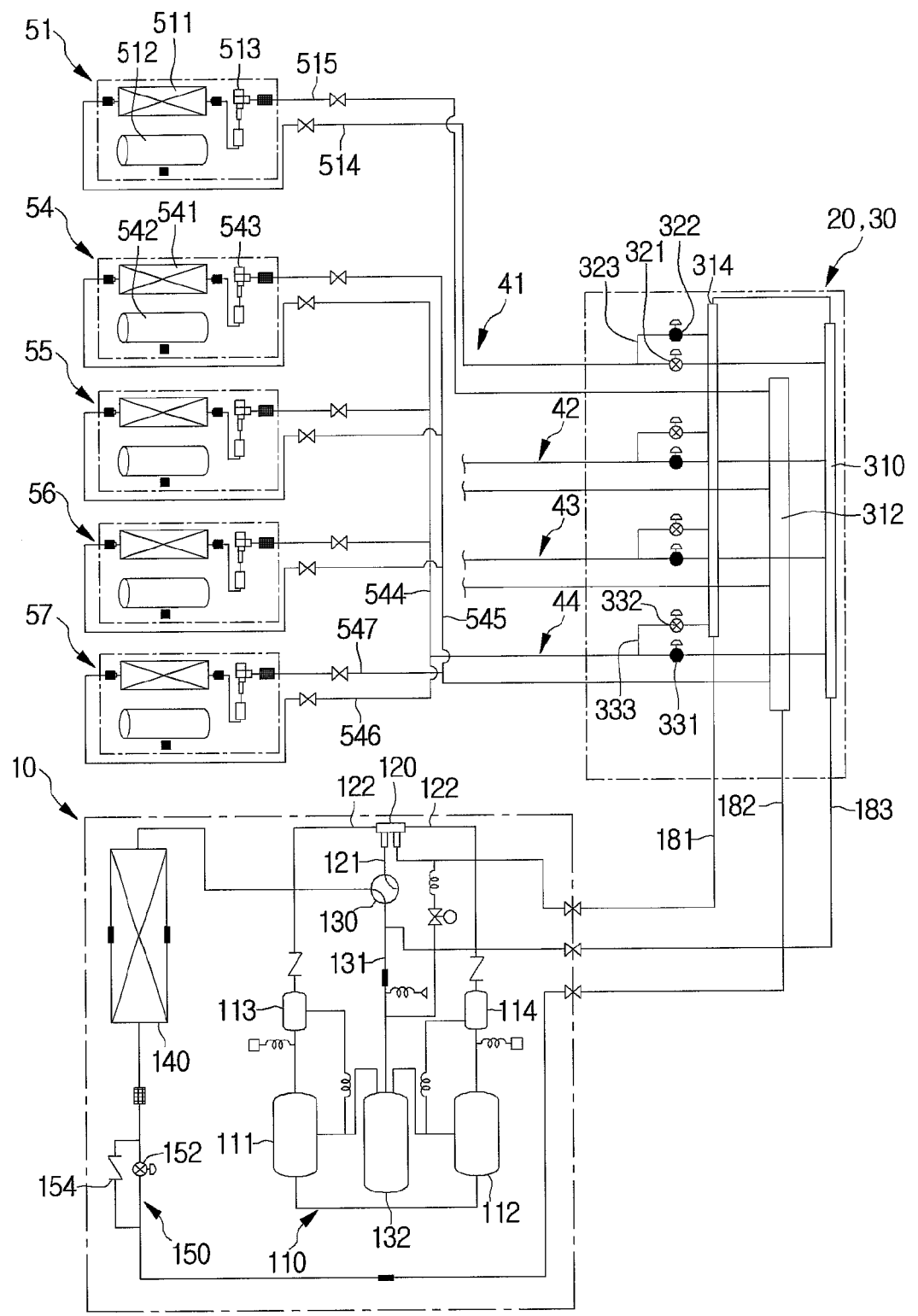
FIG. 5 is a schematic view illustrating refrigerant flow in a heating-dominant operation of a multi type air conditioner according to an embodiment as broadly described herein.

In the exemplary arrangement shown in FIG. 5, the first indoor unit 51 is in a cooling operation, and the second to seventh indoor units 52 to 57 are in a heating operation. In the heating-dominant operation, the low pressure valves 321 and 331 corresponding to the second to seventh indoor units 52 to 57 in the heating operation are closed, and the high pressure valves 322 and 332 corresponding thereto are opened. In contrast, the low pressure valve 321 corresponding to the first indoor unit 51 in the cooling operation is opened, and the high pressure valve 322 corresponding thereto is closed.

The refrigerant compressed by the compressors 111 and 112 flows from the outdoor unit 10 to the high pressure gas pipe 314 of the distributors 20 and 30 through the high pressure gas tube 181, and is condensed by the indoor heat exchangers 511 and 541 of the indoor units 52 to 57 in the heating operation. Then, the condensed refrigerant passes through the indoor expansion mechanisms 513 and 543 without expansion, and flows from the indoor units 52 to 57 to the liquid pipe 312 of the distributors 20 and 30 through the indoor liquid tubes 515 and 547.

A portion of the refrigerant flowing to the liquid pipe 312 flows to the indoor expansion mechanism 513 through the indoor liquid tube 515 connected to the indoor unit 51 in the cooling mode, and is expanded by the indoor expansion mechanism 513. The expanded refrigerant is evaporated by the indoor heat exchanger 511 of the indoor unit 51 in the cooling operation, flows to the low pressure gas pipe 310 through the indoor gas tube 514, and is then introduced into the compressors 111 and 112 through the low pressure gas tube 183.

The remaining refrigerant flowing to the liquid pipe 312 is introduced into the outdoor expansion mechanism 150 of the outdoor unit 10 through the liquid tube 182, and is expanded. The refrigerant is evaporated by the outdoor heat exchanger 140, and is introduced into the compressors 111 and 112 through the switching valve 130.

Figure 6:
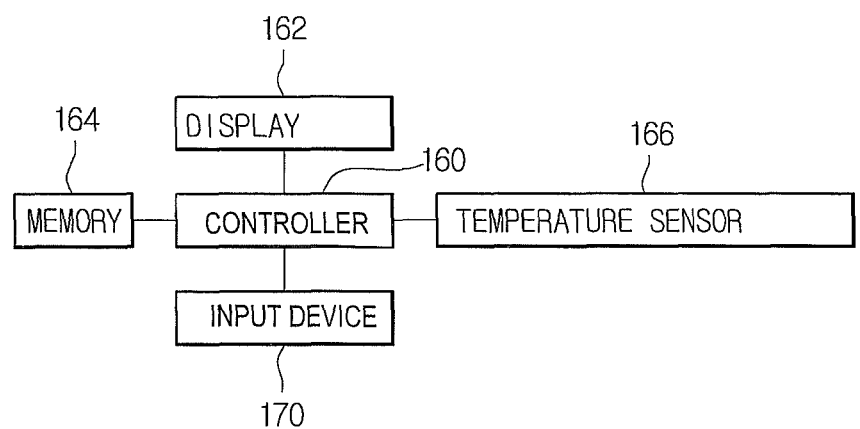
FIG. 6 is a block diagram illustrating control of a multi type air conditioner according to an embodiment as broadly described herein.

Referring to FIG. 6, the multi type air conditioner may include a controller 160, a display 162 for displaying information, a memory 164 for storing information, a temperature sensor 166 for sensing temperature, and an input device 170 for receiving a command input by a user.

The controller 160 may include, for example, an indoor controller installed on the indoor units 51 to 57, an outdoor controller installed on the outdoor unit 10, and a distributor controller installed on the distributors 20 and 30. Alternatively, the controller 160 may include only a single controller installed on one of the outdoor unit 10 or the distributors 20 and 30. In the following description, the controller 160 includes an outdoor controller installed on the outdoor unit 10, and a distributor controller installed on the distributors 20 and 30.

In certain embodiments, the display 162 may be provided at the outdoor unit 10 to display information about the indoor units 51 to 57 connected to the pipe ports 41 to 44 of the distributors 20 and 30.

The input device 170 may include a switch which may be manipulated to check information about the indoor units 51 to 57 connected to the pipe ports 41 to 44 of the distributors 20 and 30. The input device 170 may be provided at the outdoor unit 10, at the distributor 20 or 30, or other location as appropriate.

The temperature sensor 166 may sense temperature of the indoor gas tubes 514 and the common indoor gas tube 544 of the pipe ports 41 to 44. A plurality of temperature sensors 166 may be provided to correspond to the number of pipe ports 41 to 44.

The memory 164 may store temperatures sensed by the temperature sensor 166, and information about the indoor units 51 to 57 connected to the pipe ports 41 to 44 of the distributors 20 and 30. The memory 164 may be provided at the outdoor unit 10, the distributor 20 or 30, or other location as appropriate.

Figure 7:
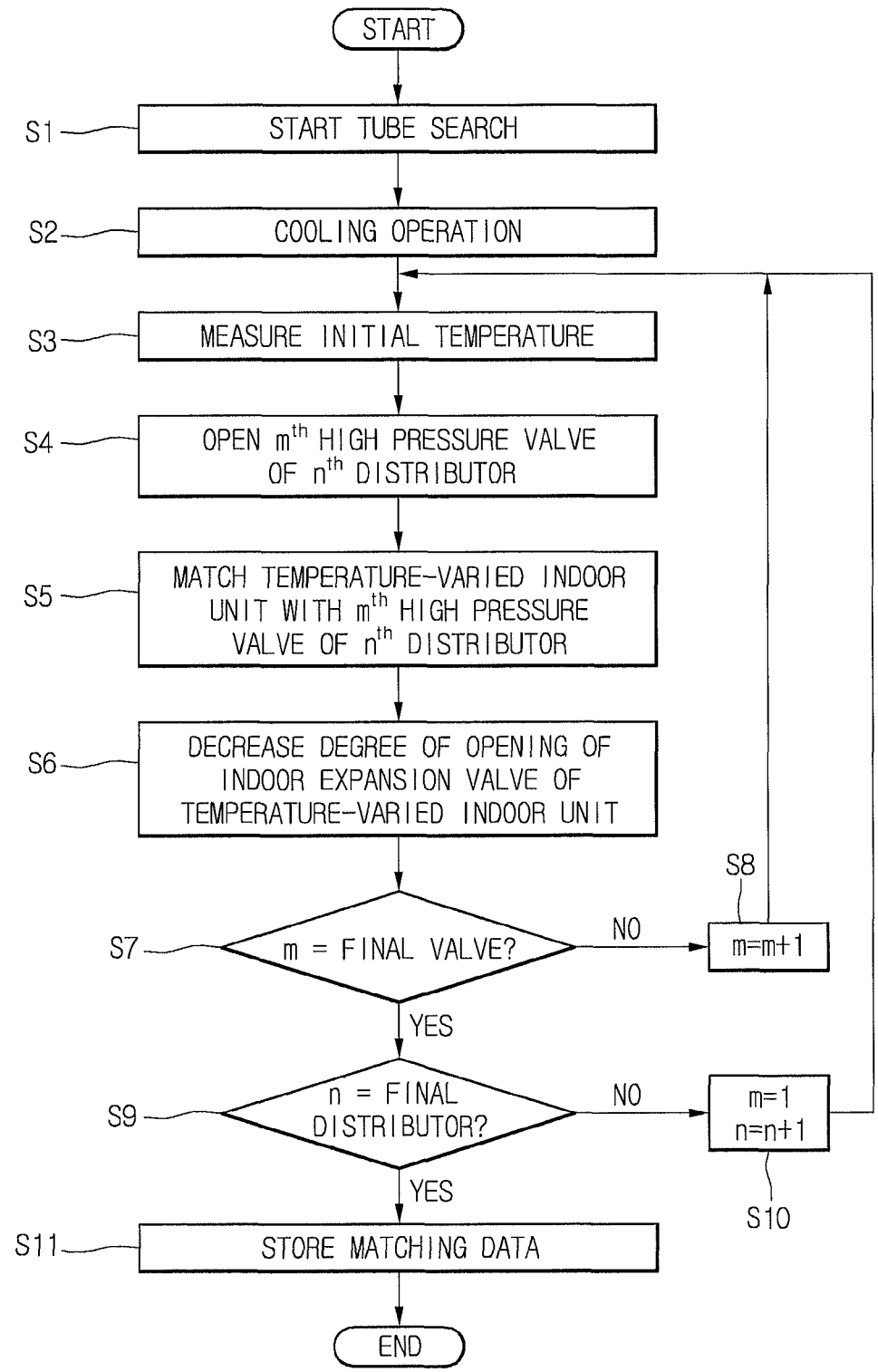
FIG. 7 is a flowchart of a method of searching for a tube of a multi type air conditioner according to an embodiment as broadly described herein.

FIG. 7 is a flowchart illustrating a method of searching for a tube of a multi type air conditioner according to an embodiment as broadly described herein.

Referring to FIGS. 1, 2, 6 and 7, in operation S1, the multi type air conditioner initiates a tube search process. This may be done when the multi type air conditioner is first driven after installation. The tube search process may be requested by, for example, selecting a predetermined button provided at one of the outdoor unit 10, the distributors 20 and 30, or the indoor units 51 to 57, or when there is no matching data related to the pipe ports 41 to 44 and the indoor units 51 to 57.

Then, in operation S2, the controller 160 transmits a tube search start command to the indoor units 51 to 57 and the distributors 20 and 30 such that all of the indoor units 51 to 57 perform a cooling operation. At this point, the low pressure valves 321 and 331 of the distributors 20 and 30 are all opened, and the high pressure valves 322 and 332 are all closed. In addition, the indoor expansion mechanisms 513 and 543 of the indoor units 51 to 57 are in a full open state.

When all of the indoor units 51 to 57 perform the cooling operation, the temperature sensor(s) 166 sense temperature of the indoor gas tubes 514 and the common indoor gas tube 544 in operation S3, and the sensed temperature is stored as an initial temperature in the memory 164.

In operation S4, an mth high pressure valve of an nth distributor is opened, where n and m denote a distributor number and a high pressure valve number, respectively. These may be arbitrary numbers for conveniently describing sequential control of the distributors 20 and 30 and the high pressure valves 322 and 332. Thus, an initial value of m and n may be 1. A high pressure valve number may be the same as a pipe port number of the pipe ports 41 to 44 of the distributors 20 and 30.

That is, when the tube search process starts, a first high pressure valve provided at a first pipe port of a first distributor is opened, and a first low pressure valve provided at the first pipe port is closed. Then, the refrigerant in a high pressure gas state is introduced into one or more indoor units connected to the first pipe port, and thus, the indoor units perform a heating operation.

As such, when control of the first high pressure valve and the first low pressure valve of the first pipe port is completed, the temperature sensor 166 senses temperature of the indoor gas tubes 514 and the common indoor gas tubes 544 after a predetermined amount of time has elapsed.

Then, the controller 160 compares the measured temperature with the initial temperature stored in the memory 164 to search for a temperature-varied indoor unit. In this case, a temperature of the temperature-varied indoor unit is higher than the initial temperature. Then, the temperature-varied indoor unit is matched with the mth high pressure valve of the nth distributor in operation S5.

Since one or more indoor units may be connected to one pipe port as described above, when a temperature of gas tubes of indoor units is varied, the indoor units may be matched with a particular pipe port.

Next, in operation S6, the degree of opening of the indoor expansion mechanism (indoor expansion valve) of the indoor unit identified in the previous operation, may be decreased to prevent the identified indoor unit from being identified again. That is, the degree of opening of the indoor expansion mechanism of the identified indoor unit is adjusted to be less than or equal to a certain degree of opening. Then, an indoor unit including the indoor expansion mechanism having a degree of opening less than or equal to the certain degree of opening is not searched for by the controller 160.

For example, when the indoor expansion mechanism of an indoor unit has a degree of opening less than or equal to the certain degree of opening, a gas tube temperature of the indoor unit is not sensed by the temperature sensor 166, or a temperature sensed by the temperature sensor 166 is not compared with the initial temperature.

When the first pipe port is matched with a specific indoor unit, the first high pressure valve is closed, and the first low pressure valve is opened. Next, the second high pressure valve of a second pipe port is opened, and the second low pressure valve thereof is closed. That is, an m+1th high pressure valve of the nth distributor is opened. In operation S7, the controller 160 determines whether matching of all pipe ports of the nth distributor is completed. A process of matching a next pipe port with an indoor unit is performed in operation S8 until matching of all pipe ports is completed.

If the matching of all pipe ports of the nth distributor is completed, each pipe port of an n+1th distributor is matched with an indoor unit. In operation S9, it is determined whether matching of all pipe ports of a final distributor with indoor units is completed. A process of matching pipe ports of a next distributor with indoor units is performed in operation S10 until matching of all pipe ports is completed.

If matching of all pipe ports of all distributors with indoor units is completed, matching data is stored in the memory 164, and matching data information may be displayed on the display 162.

In the exemplary process shown in FIG. 7, the tube search process is performed after all of the indoor units 51 to 57 perform the cooling operation. However, such a tube search process may be performed after all of the indoor units 51 to 57 perform a heating operation.

Figure 8:
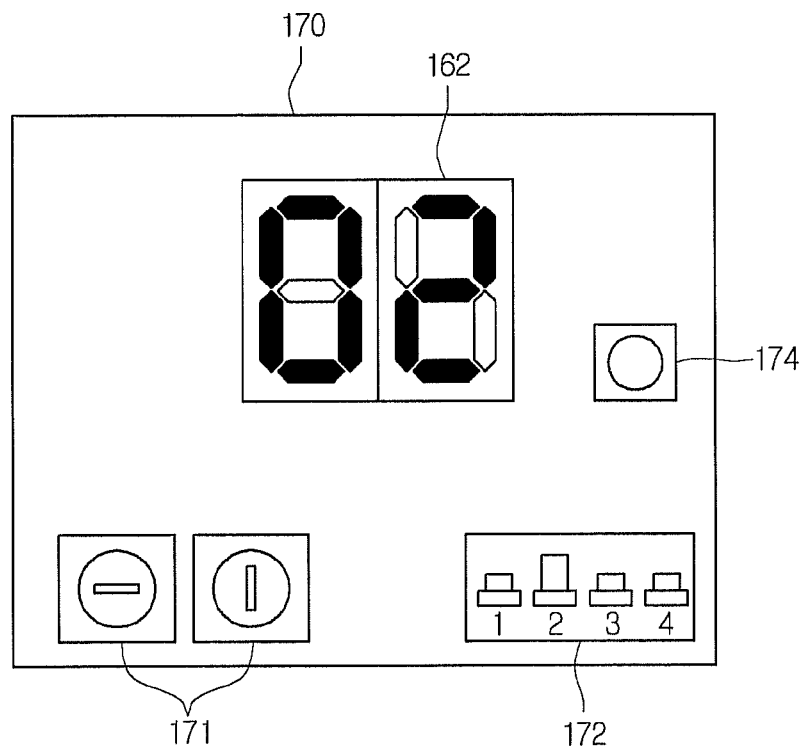
FIG. 8 is a schematic view of a display and an input device of an outdoor unit according to an embodiment as broadly described herein.

FIG. 8 is a schematic view of a display and an input device of an outdoor unit according to an embodiment as broadly described herein.

Referring to FIGS. 6 and 8, the input device 170 may include one or more distributor switches 171 (distributor selectors); one or more pipe port switches 172 (pipe port selectors); and a selector 174 for selecting a specific indoor unit as a main indoor unit from a grouping of indoor units.

The number of distributor switches 171 provided may be equal to the number of the distributors 20 and 30 connected to the outdoor unit 10. The number of pipe port switches 172 may be equal to the number of the pipe ports 41 to 44 provided to the distributors 20 and 30.

At least one of a rotary switch, a dual in-line package (DIP) switch, an on/off push button switch, or other type of switch as appropriate, may be used as the distributor switches 171 and the pipe port switches 172.

The display 162 may display the matching of an indoor unit with a specific pipe port of a specific distributor. For example, when a specific distributor and a specific pipe port are selected using the distributor switches 171 and the pipe port switches 172, information about an indoor unit matched with the specific pipe port of the specific distributor may be displayed on the display 162. The information about the indoor unit may be, for example, a specific number stored in the indoor unit or other information associated with the indoor unit.

When a plurality of indoor units are matched with a specific pipe port of a specific distributor, information about the indoor units may be sequentially displayed at predetermined intervals of time. Then, a user may view the displayed information, and select any one of the indoor units as a main indoor unit from the matched indoor units, that is, from grouped indoor units, by means of the selector 174. The selected main indoor unit may be replaced with another one of the indoor units by means of the selector 174.

For example, if a specific one of the grouped indoor units is displayed on the display 162, depression of the selector 174, while the specific indoor unit is displayed may set the displayed unit as the main indoor unit. The others of the grouped indoor units may then be set as sub indoor units.

In an alternative embodiment, information about the grouped indoor units may be simultaneously displayed on the display 162. In this case, an indoor unit to be selected as the main indoor unit may be selected/changed according to the number of times the selector 174 is pressed. In addition, when the selector 174 is pressed continually for certain amount of time, a corresponding indoor unit may be set as the main indoor unit. After that, the main indoor unit and the sub indoor units may be separately displayed on the display 162.

Figure 9:
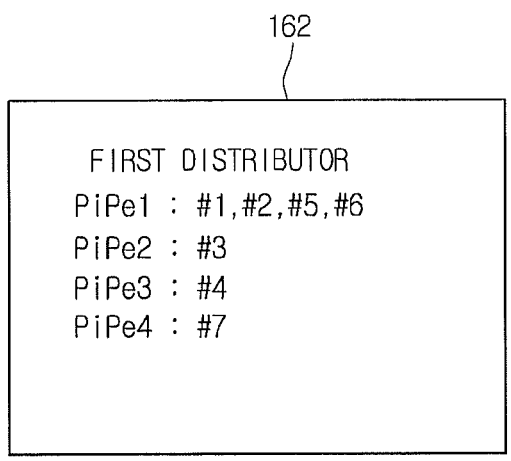
FIG. 9 is a schematic view of a display according to an embodiment as broadly described herein.

FIG. 9 is a schematic view of a display according to an embodiment as broadly described herein.

Referring to FIG. 9, a display 162 according to the current embodiment may simultaneously display information about indoor units matched with pipe ports of a specific distributor. In the example shown in FIG. 9, the display 162 may indicate the first, second, fifth, and sixth indoor units are matched with a first pipe port, a third indoor unit is matched with a second pipe port, a fourth indoor unit is matched with a third pipe port, and a seventh indoor unit is matched with a fourth pipe port.

The display 162 may be provided at the outdoor unit 10, or at one of the distributors 20 or 30. Alternatively, displays that are provided with respective indoor units 51 to 57 may display information about indoor units matched with pipe ports of a specific distributor.

Accordingly, since distributor information, pipe port information, and indoor unit information may be displayed together, a user may easily check indoor units corresponding to pipe ports.

Figure 10:
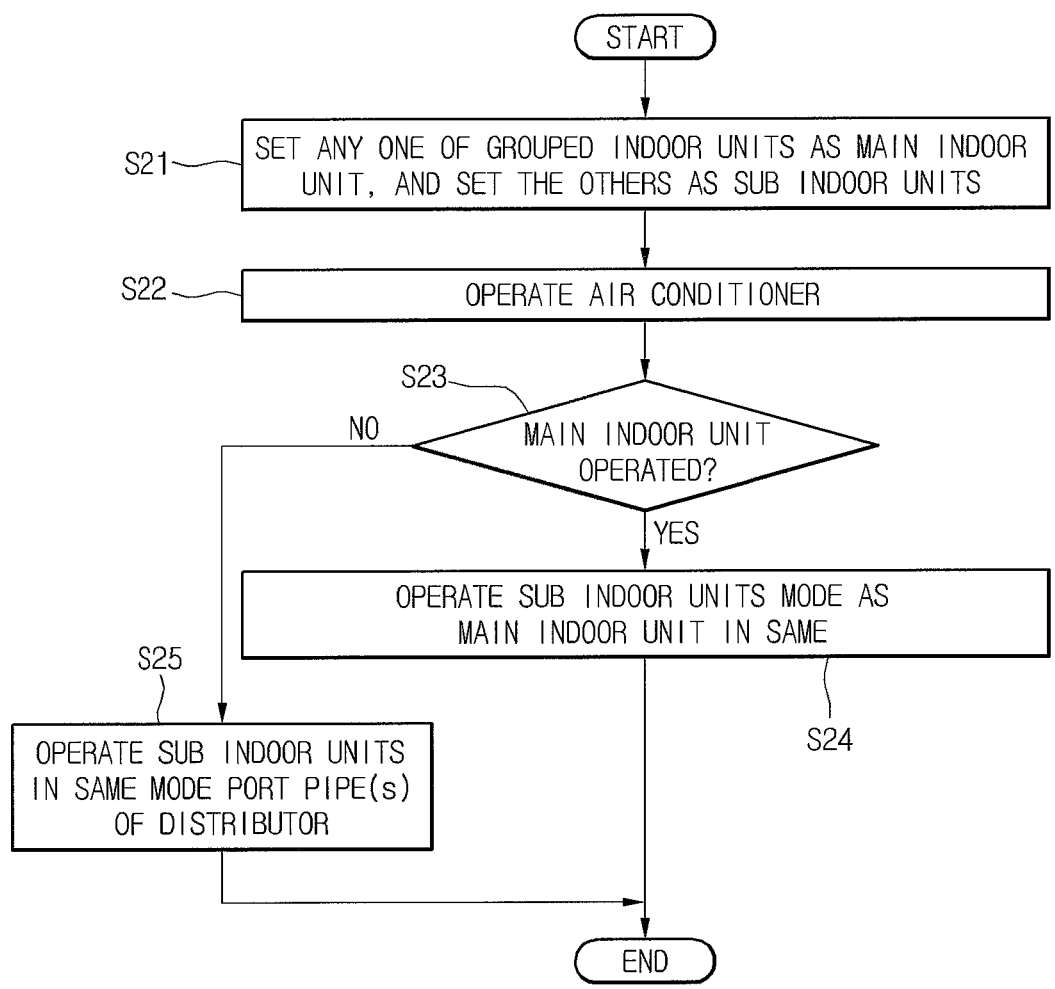
FIG. 10 is a flowchart of a method of controlling a multi type air conditioner according to an embodiment as broadly described herein.

FIG. 10 is a flowchart illustrating a method of controlling a multi type air conditioner according to an embodiment as broadly described herein.

Referring to FIG. 10, after a tube search process is completed, any one of a group of indoor units may be set as a main indoor unit in operation S21, and the remaining indoor units may be set as sub indoor units in operation S21. In operation S22, the multi type air conditioner may be operated in response to an operation command for one or more of the grouped indoor units.

In operation S23, it is determined whether the main indoor unit is operated. In particular, when the main indoor unit starts to operate with the other indoor units stopped, a pipe port corresponding to the main indoor unit may be set to an operation mode of the main indoor unit. For example, when the main indoor unit is operated in a cooling mode, the pipe port corresponding to the main indoor unit may also be set to a cooling mode. On the contrary, when the main indoor unit is operated in a heating mode, the pipe port corresponding to the main indoor unit may also be set to a heating mode. Similarly, when a mode of the main indoor unit is changed, the mode of the pipe port corresponding to the main indoor unit may also be changed.

A mode of the pipe port denotes a control mode for a corresponding high pressure valve and a corresponding low pressure valve. That is, when the pipe port is in a cooling mode, the high pressure valve of the pipe port is closed, and the lower pressure valve thereof is opened. On the contrary, when the pipe port is in a heating mode, the high pressure valve of the pipe port is opened, and the lower pressure valve thereof is closed.

When the main indoor unit is operated, an operation mode of the sub indoor units may imitate an operation mode of the main indoor unit in operation S24. That is, when the main indoor unit is in a cooling mode, even when a heating operation command for a specific sub indoor unit is input, the specific sub indoor unit is not operated in a heating mode, but instead is operated in a cooling mode, corresponding to the main unit. In this case, the specific sub indoor unit may output information indicating that it is not being operated in the selected heating mode, but in a cooling mode.

On the contrary, when the main indoor unit is not operated, an operation mode of the sub indoor units may imitate a mode of the pipe port in operation S25. For example, when the main indoor unit is operated in a cooling mode, the pipe port is set to a cooling mode. Then, operation the main indoor unit may be stopped. After that, even when a heating operation command for a specific sub indoor unit is input, the specific sub indoor unit operates in accordance with the cooling mode of the pipe port, and thus, is not operated in a heating mode, but instead in a cooling mode. In this case, the specific sub indoor unit may output information that it is not being operated in the selected heating mode, but rather, in a cooling mode.

That is, even though a specific operation command may be input to a specific sub indoor unit, the specific sub indoor unit may not be operated according to the specific operation command, and notification of this change in operation mode may be provided.

Even when the grouped indoor units are all stopped, a previous mode of the pipe port may be maintained.

Alternatively, when the grouped indoor units are all stopped, a previous mode of the pipe port may be canceled. In this state, when a specific operation command (e.g., heating operation command) for a specific sub indoor unit is input, the specific sub indoor unit may be operated in a heating mode, and the pipe port may be set to a heating mode. Then, when a cooling operation command for a main indoor unit is input, the heating mode of the pipe port may be changed to a cooling mode, and the sub indoor unit may then be operated in a cooling mode as described above.

Alternatively, the grouped indoor units may all be controlled to imitate a mode of the pipe port. The mode of the pipe port may be changed when all of the grouped indoor units are operated in the same mode. For example, when all of the grouped indoor units are operated in a cooling mode with the pipe port set to a cooling mode, and the grouped indoor units are switched to a heating mode, the pipe port may also be switched to a heating mode. A mode of the pipe port may be cancelled when the grouped indoor units are all stopped. In this state, when one of the grouped indoor units is operated first, the pipe port may be set to a mode of the first-operated indoor unit.

Herein, an operation mode of the main indoor unit, or a mode of the pipe port may be referred to as a reference mode.

To sum up, when an operation command is input to at least one indoor unit of a grouping of indoor units (an indoor unit group), the indoor unit operates in a reference mode.

According to embodiments as broadly described herein, a plurality of indoor units may be connected to a pipe port of a distributor, and thus additional distributors are unnecessary, thereby reducing cost and labor for installing additional distributors.

In addition, an operation mode of grouped indoor units may imitate a mode of a main indoor unit or a pipe port, and thus the grouped indoor units may be prevented from being operated in different modes.

Embodiments provide a multi type air conditioner and a method of controlling such a multi type air conditioner in which a plurality of indoor units are connected to a pipe port of a distributor.

In one embodiment, a multi type air conditioner as embodied and broadly described herein may include an outdoor unit; a distributor connected to the outdoor unit and including pipe ports; and a plurality of indoor units connected to the distributor, wherein two or more of the indoor units are connected to one or more of the pipe ports to constitute an indoor unit group, and an operation mode of the two or more indoor units constituting the indoor unit group imitates a reference mode.

In another embodiment, a method of controlling a multi type air conditioner as embodied and broadly described herein may include an outdoor unit; a distributor connected to the outdoor unit and including pipe ports; and a plurality of indoor units connected to the distributor, wherein two or more of the indoor units are connected to one or more of the pipe ports to constitute an indoor unit group of each pipe port, includes: inputting an operation command to one or more of the indoor units constituting the indoor unit group; checking a reference mode of the indoor unit group; and imitating the reference mode to operate the one or more indoor units.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling a multi type air conditioner including an outdoor unit, a distributor connected to the outdoor unit, and a plurality of indoor units connected to the distributor by a plurality of pipe ports, with two or more of the indoor units connected to one of the plurality of pipe ports to form an indoor unit group, the method comprising:
receiving an operation command at one or more of the indoor units of the indoor unit group;
determining a reference operation mode of the indoor unit group;
comparing the reference operation mode to an operation mode associated with the received operation command; and
operating the one or more indoor units of the indoor unit group at which the operation command was received in the reference mode, wherein the indoor unit group comprises a main indoor unit and one or more sub indoor units, and the reference operation mode is an operation mode of the main indoor unit, wherein the operating of the one or more indoor units of the indoor unit group comprises operating the main indoor unit and all of the one or more sub indoor units in the operation mode of the main indoor unit, and wherein the method further comprises:
setting an operation mode of the one of the plurality of pipe ports to which the indoor unit group is connected to correspond to the operation mode of the main indoor unit;
setting the reference operation mode to the mode of the one of the plurality of pipe ports when the main indoor unit is stopped; and
setting the operation mode of the one or more sub indoor units to the operation mode of the one of the plurality of pipe ports.

2. The method of claim 1, further comprising setting the reference operation mode to the operation mode of the one of the plurality of pipe ports when all of the indoor units of the indoor unit group are stopped.

3. The method of claim 1, further comprising cancelling the operation mode of the one of the plurality of pipe ports when all of the indoor units of the indoor unit group are stopped.

4. The method of claim 3, wherein the cancelling of the operation mode of the one of the plurality of pipe ports further comprises re-setting the operation mode of the one of the plurality of pipe ports to an operation mode of a first-operated indoor unit of the indoor unit group.

5. The method of claim 1, wherein the reference operation mode is a mode of the one of the plurality of pipe ports to which the two or more indoor units of the indoor unit group are connected, and wherein the method further comprises:
when the indoor units of the indoor unit group are all operated all in a selected operation mode, re-setting the operation mode of the one of the plurality of pipe ports to the selected operation mode; and
when the two or more indoor units of the indoor unit group are all stopped, cancelling the operation mode of the one of the plurality of pipe ports.

6. The method of claim 1, wherein the comparing of the reference operation mode to the operation mode associated with the received operation command comprises, when the operation mode associated with the received operation command is different from the reference operation mode, outputting an external notification that the one or more indoor units are not operated in the operation mode associated with the received operation command.

7. The method of claim 1, wherein before the receiving an operation command at one or more of the indoor units of the indoor unit group, the method further comprises:
searching for one or more indoor units respectively connected to the plurality of pipe ports of the distributor;
matching each of the plurality of pipe ports with one or more indoor units and storing matching information in a memory; and
displaying the two or more indoor units of the indoor unit group connected to a specific pipe port simultaneously or sequentially on a display.

8. The method of claim 7, wherein the searching for the one or more indoor units respectively connected to the plurality of pipe ports of the distributor comprises:
searching for and identifying an indoor unit connected to a specific pipe port from amongst the plurality of indoor units;
matching the identified indoor unit with the specific pipe port; and
adjusting a degree of opening of an indoor expansion mechanism of the identified indoor unit.

9. The method of claim 8, wherein the searching for and identifying the indoor unit comprises searching for and identifying the indoor unit while a degree of opening of an indoor expansion mechanism of each of the plurality of indoor units is in a full open state, and wherein the adjusting of the degree of the opening of the indoor expansion mechanism of the identified indoor unit comprises adjusting the degree of the opening of the indoor expansion mechanism of the identified indoor unit to be a certain value or less.

10. A method of controlling a multi type air conditioner including an outdoor unit, a distributor connected to the outdoor unit, and a plurality of indoor units connected to the distributor by a plurality of pipe ports, with two or more of the indoor units connected to one of the plurality of pipe ports to form an indoor unit group, the method comprising:

receiving an operation command at one or more of the indoor units of the indoor unit group;

determining a reference operation mode of the indoor unit group;

comparing the reference operation mode to an operation mode associated with the received operation command; and operating the one or more indoor units of the indoor unit group at which the operation command was received in the reference mode, wherein the reference operation mode is a mode of the one of the plurality of pipe ports to which the two or more indoor units of the indoor unit group are connected, and wherein the method further comprises:

when the indoor units of the indoor unit group are all operated all in a selected operation mode, re-setting the operation mode of the one of the plurality of pipe ports to the selected operation mode; and when the two or more indoor units of the indoor unit group are all stopped, cancelling the operation mode of the one of the plurality of pipe ports.

11. A method of controlling a multi type air conditioner including an outdoor unit, a distributor connected to the outdoor unit, and a plurality of indoor units connected to the distributor by a plurality of pipe ports, with two or more of the indoor units connected to one of the plurality of pipe ports to form an indoor unit group, the method comprising:

receiving an operation command at one or more of the indoor units of the indoor unit group;

determining a reference operation mode of the indoor unit group;

comparing the reference operation mode to an operation mode associated with the received operation command; and operating the one or more indoor units of the indoor unit group at which the operation command was received in the reference mode, wherein comparing the reference operation mode to an operation mode associated with the received operation command comprises, when the operation mode associated with the received operation command is different from the reference operation mode, outputting an external notification that the one or more indoor units are not operated in the operation mode associated with the received operation command.

* * * * *